US007117357B2

(12) United States Patent
Bade

(10) Patent No.: US 7,117,357 B2
(45) Date of Patent: Oct. 3, 2006

(54) METHOD, SYSTEM, AND PRODUCT FOR PRE-ENCRYPTING STATIC INFORMATION TRANSMITTED BY SECURE WEB SITES

(75) Inventor: Steven A. Bade, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 09/892,969

(22) Filed: Jun. 27, 2001

(65) Prior Publication Data

US 2003/0005282 A1 Jan. 2, 2003

(51) Int. Cl.
*H04L 9/18* (2006.01)

(52) U.S. Cl. ........................................ 713/151; 713/165
(58) Field of Classification Search ................. 713/151, 713/165; 705/51; 709/201, 203
See application file for complete search history.

(56) References Cited

U.S. PATENT DOCUMENTS 5,796,825 A * 8/1998 McDonnal et al. ......... 713/165

OTHER PUBLICATIONS

Weeks et al. "CCI–Based Web Security: A Design Using PGP", 1995 Fourth International World Wide Web Conference.*

* cited by examiner

*Primary Examiner*—Gregory Morse
*Assistant Examiner*—Thomas Ho
(74) *Attorney, Agent, or Firm*—Duke W. Yee; Diana R. Gerhardt; Francis Lammes

(57) ABSTRACT

A data processing system, method, and product are disclosed for pre-encrypting static information transmitted by secure Web sites. The data processing system includes a server computer system coupled to a client computer system utilizing a network. The server computer system receives a request for a secure Web page that is maintained by the server. The secure Web page includes dynamically-changing information and static information. The server encrypts and transmits the encrypted dynamically-changing information. The server determines whether the static information has been pre-encrypted. If the static information has been pre-encrypted, the server bypasses the encryption step and transmits the pre-encrypted static information.

21 Claims, 5 Drawing Sheets

METHOD, SYSTEM, AND PRODUCT FOR PRE-ENCRYPTING STATIC INFORMATION TRANSMITTED BY SECURE WEB SITES

BACKGROUND OF THE INVENTION

1. Technical Field

The present invention relates generally to the field of computer systems and, more specifically to a data processing system, method, and product for pre-encrypting static information transmitted by secure Web sites.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, such as the Internal Revenue Service and secretaries of state, which must interact with virtually all segments of society. Providing informational guides and/or searchable databases of online public records may reduce operating costs. Further, the Internet is becoming increasingly popular as a medium for commercial transactions.

The Internet includes the World Wide Web. Web-based applications, executed by server computer systems, may be accessed by client computer systems. In order to access a Web-based application, a user first must establish an Internet connection. The user may then specify a URL (uniform resource locator) of a particular Web page. A Web page includes an HTML file and associated files for displaying images, such as graphics images.

Each Web page may contain text, graphics, images, sound, multimedia files, links to other Web pages, and any other type of electronic information. The server computer system does not typically store all of the components of a Web page in one single file. Instead, the server stores code in the HTML file which can be used by a client's Web browser in order to build the page. The server, thus, stores references to enable the browser to find the files that are needed to display the various text and images which then make up the Web page.

Many Internet Web sites encrypt the data transmitted between the site's server computer system and the user's client computer system, and, therefore, are considered to be "secure" sites. The Secure Sockets Layer (SSL) is a commonly-used protocol that describes the security used to transmit data from a secure site via the Internet. The SSL protocol includes a record layer which is responsible for encrypting and transmitting data.

Secure sites encrypt all data transferred to the client computer systems. Therefore, when a client's browser requests a particular page, all of the information needed to create the page is encrypted and then transmitted to the client's browser. All of the information is encrypted each time it is requested.

Encrypting all of the data each time a Web page is requested is often unnecessary. The percentage of the Web page including information that should be encrypted may be small. Many Web pages include various marketing information and logos that are not unique to any particular page, are not security sensitive, and do not change frequently. For example, company logo images do not often change.

The known systems described above encrypt the non-sensitive and static data along with the security sensitive data each time the information is transmitted to a client. This is unnecessary and can be very time-consuming.

Therefore, a need exists for a method, system, and product whereby a secure Web site stored pre-encrypted static information. The Web site then encrypts dynamically-changing information in response to each request, and bypasses the encryption step for the static information that has been pre-encrypted.

SUMMARY OF THE INVENTION

A data processing system, method, and product are disclosed for pre-encrypting static information transmitted by secure Web sites. The data processing system includes a server computer system coupled to a client computer system utilizing a network. The server computer system receives a request from a client for a secure Web page that is maintained by a secure Web site within the server. Because the Web page is maintained by a secure Web site, a security session is established between the client and server. A cache is associated with this session.

The secure Web page includes dynamically-changing information and static information. The server encrypts and then transmits the encrypted dynamically-changing information. For the static information, the server first checks the current session's cache to determine whether a pre-encrypted version of the static information is already stored in the cache. If a pre-encrypted version is found in the cache, the server bypasses the encryption step and then transmits the pre-encrypted version of the static information. If a pre-encrypted version of the static information has not already been stored in the cache, the server encrypts the static information, transmits the encrypted static information, and stores the encrypted static information in the cache for future use.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

Figure 1:
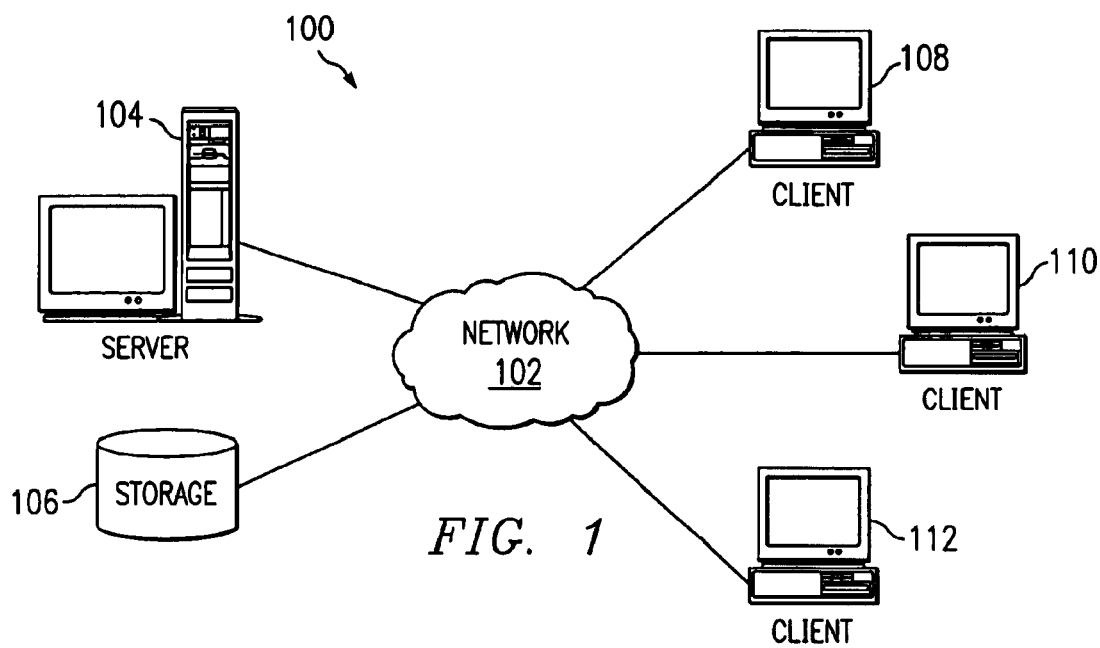
FIG. 1 is a pictorial representation which depicts a data processing system in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
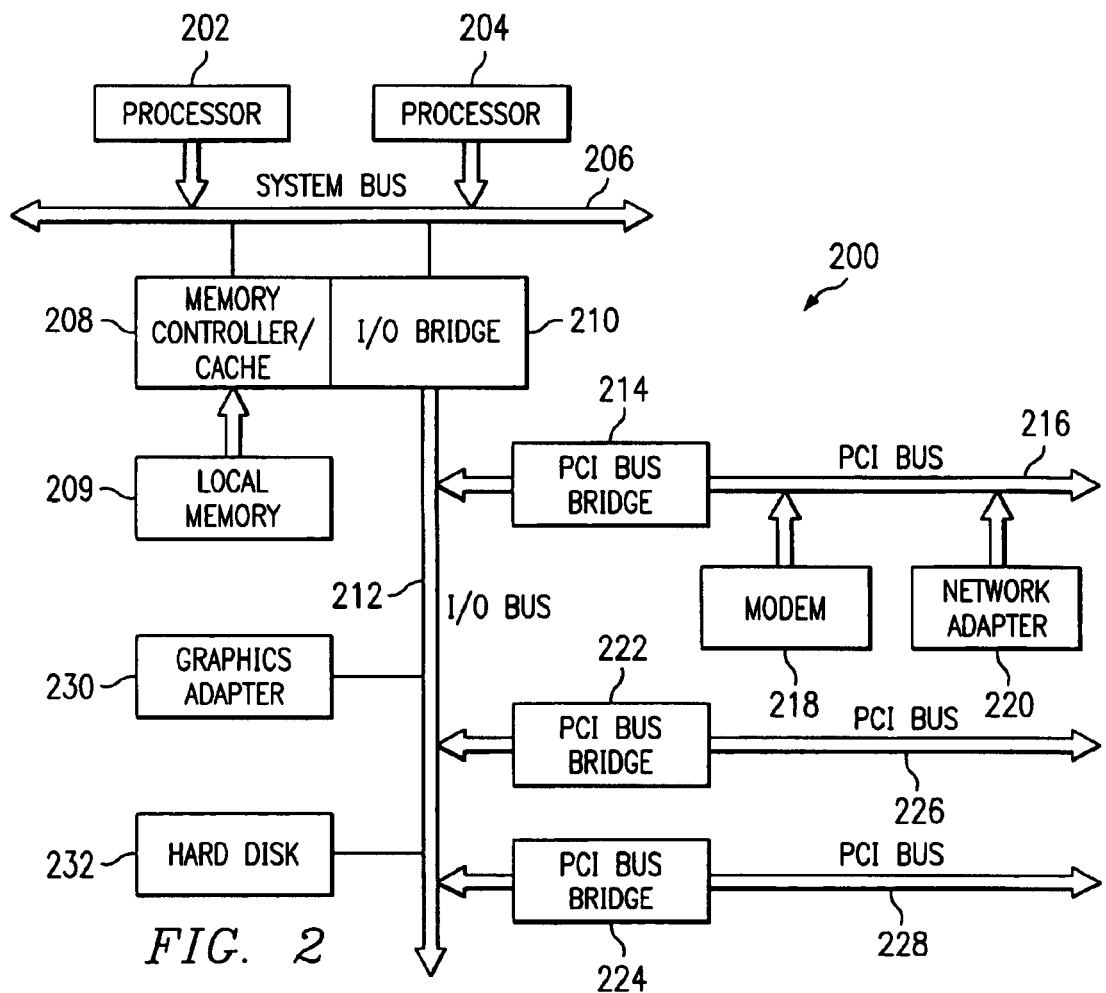
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
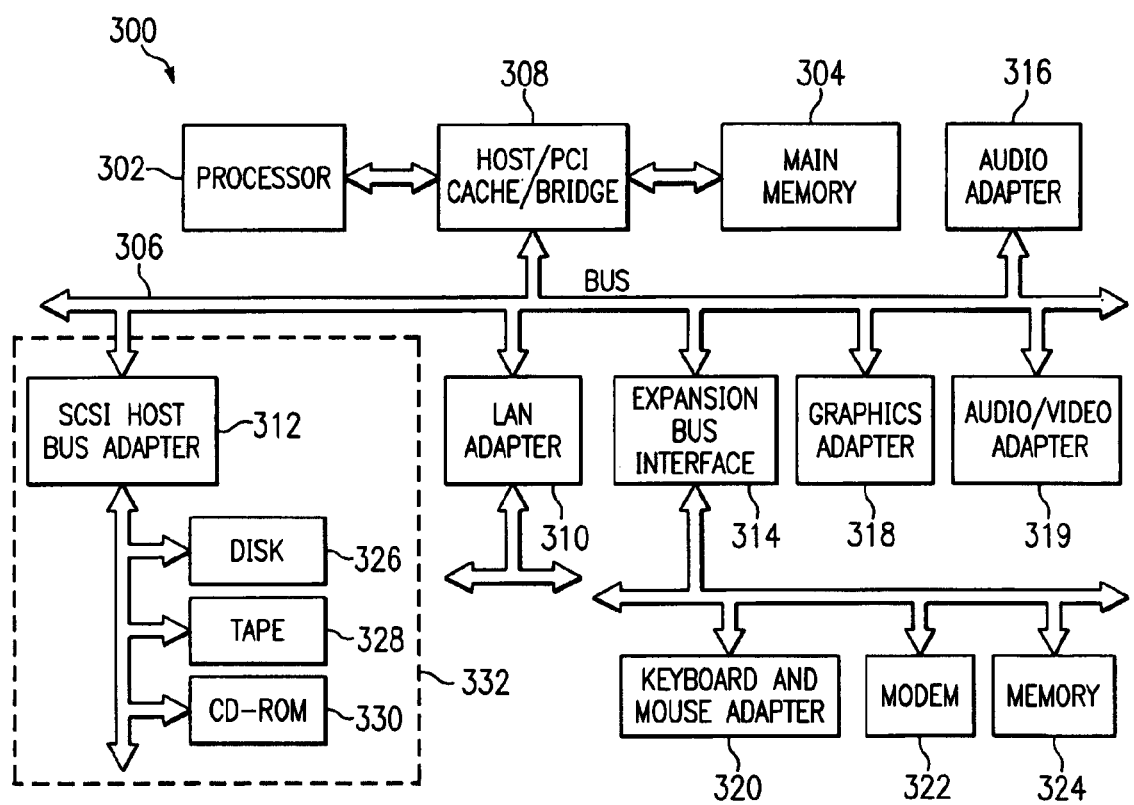
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Each Web page may contain text, graphics, images, sound, multimedia files, links to other Web pages, and any other type of electronic information. The server computer system stores code in an HTML file which is used by a client's Web browser in order to build the page. When the user requests a particular page, the user types in the page URL. This HTML file is then returned to the browser. The HTML file tells the browser where to find the necessary components of the page, such as text files, image files, etc., as well as how to build the page. The flowcharts below describe the process used to obtain and display each component of a Web page.

Figure 4:
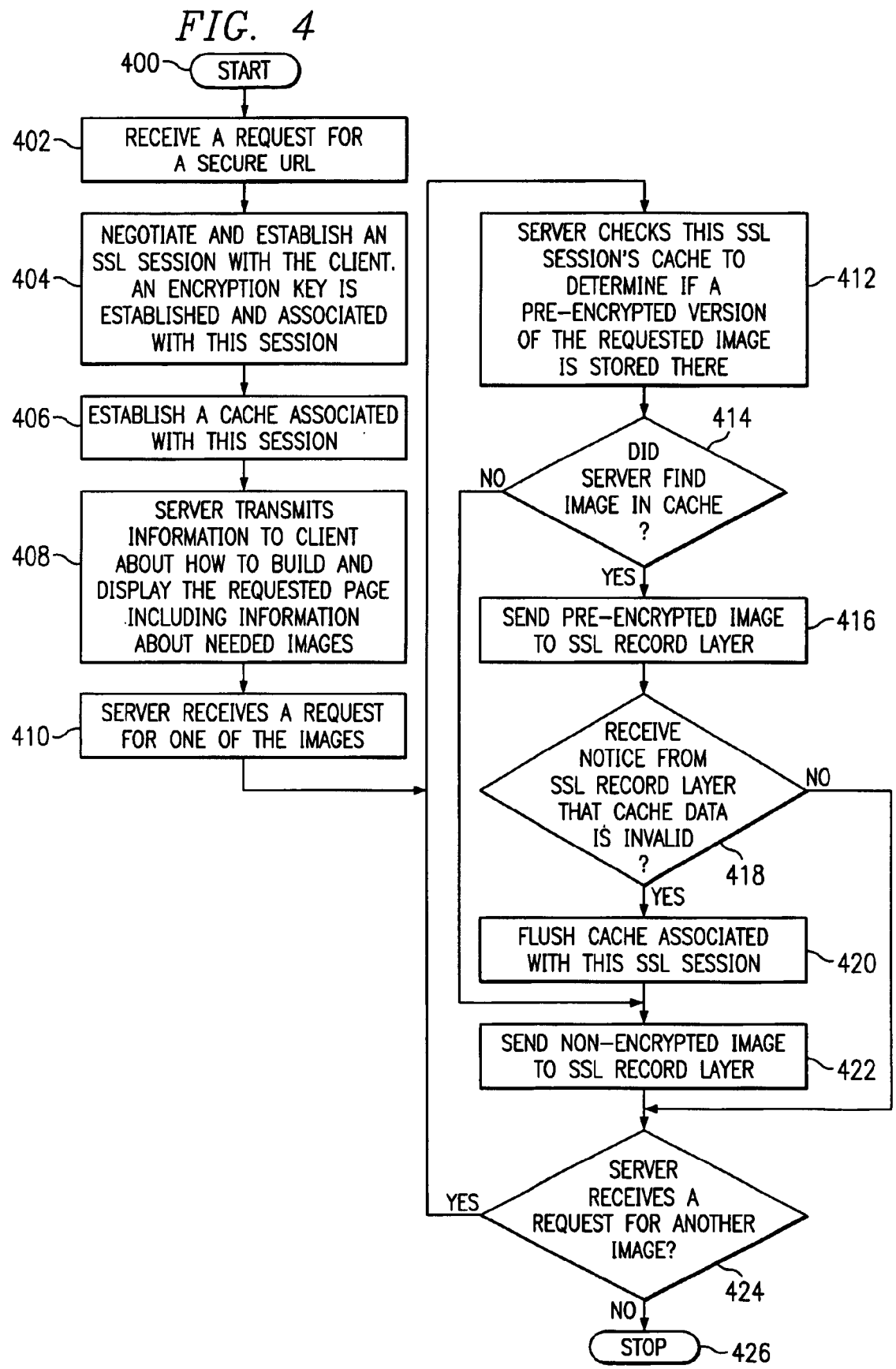
FIG. 4 depicts a high level flow chart which illustrates a process executing within a server computer system for transmitting pre-encrypted data in accordance with the present invention.

FIG. 4 depicts a high level flow chart which illustrates a process executing within a server computer system for transmitting pre-encrypted data in accordance with the present invention. The process starts as depicted by block 400 and thereafter passes to block 402 which illustrates a server computer system receiving a request for a secure URL. Next, block 404 depicts the server establishing an SSL session with the client. An encryption key is established and associated with this session. Once an SSL session is established, all data transmitted by the server to the client will be encrypted, either pre-encrypted or encrypted at the time of transmission.

The process then passes to block 406 which illustrates the server establishing a cache which is associated with this session. A separate cache is established within the server for each session. Therefore, each session has an associated cache. Block 408, then, depicts the server transmitting information from an HTML file associated with this page to the client about how to build and display the secure Web page that the client requested. This information includes information about images that are to be displayed as part of the requested Web page.

The process then passes to block 410 which illustrates the server receiving a request for an image which is a component of the requested Web page. Next, block 412 depicts the server checking the cache associated with this SSL session to determine whether a pre-encrypted version of the image is already stored in the cache. If the image is static and has been requested before during this session, a pre-encrypted version of the image will already be stored in the session's cache. If the image is static and has not been requested before during this session or if the image is dynamically-changing, a pre-encrypted version will not be stored in the cache. Static information which changes infrequently can be pre-encrypted and stored in the cache for future use. Block 414, then, illustrates a determination of whether or not the server found a pre-encrypted version of the image in the cache. If a determination is made that the server did not find a pre-encrypted version of the image in the cache, the process passes to block 422.

Referring again to block 414, if a determination is made that the server did find a pre-encrypted version of the image in the cache, the process passes to block 416 which depicts the server sending this pre-encrypted version of the image to the SSL record layer. Next, block 418 illustrates a determination of whether or not the server received a notice from the SSL layer that the cache data, i.e. the pre-encrypted version of the image, is invalid. If a determination is made that the server did not receive a notice that the cache data is invalid, i.e. the cache data is thus valid, the process passes to block 424. Referring again to block 418, if a determination is made that the server did receive a notice that the cache data is invalid, the process passes to block 420 which depicts the server flushing the cache that is associated with this SSL session.

The process then passes to block 422 which illustrates the server sending a non-encrypted version of the image to the SSL record layer. Next, block 424 illustrates a determination of whether or not the server has received a request for another image. If a determination is made that the server has received a request, the process passes back to block 412. Referring again to block 424, if a determination is made that the server has not received a request, the process passes to block 426.

Figure 5:
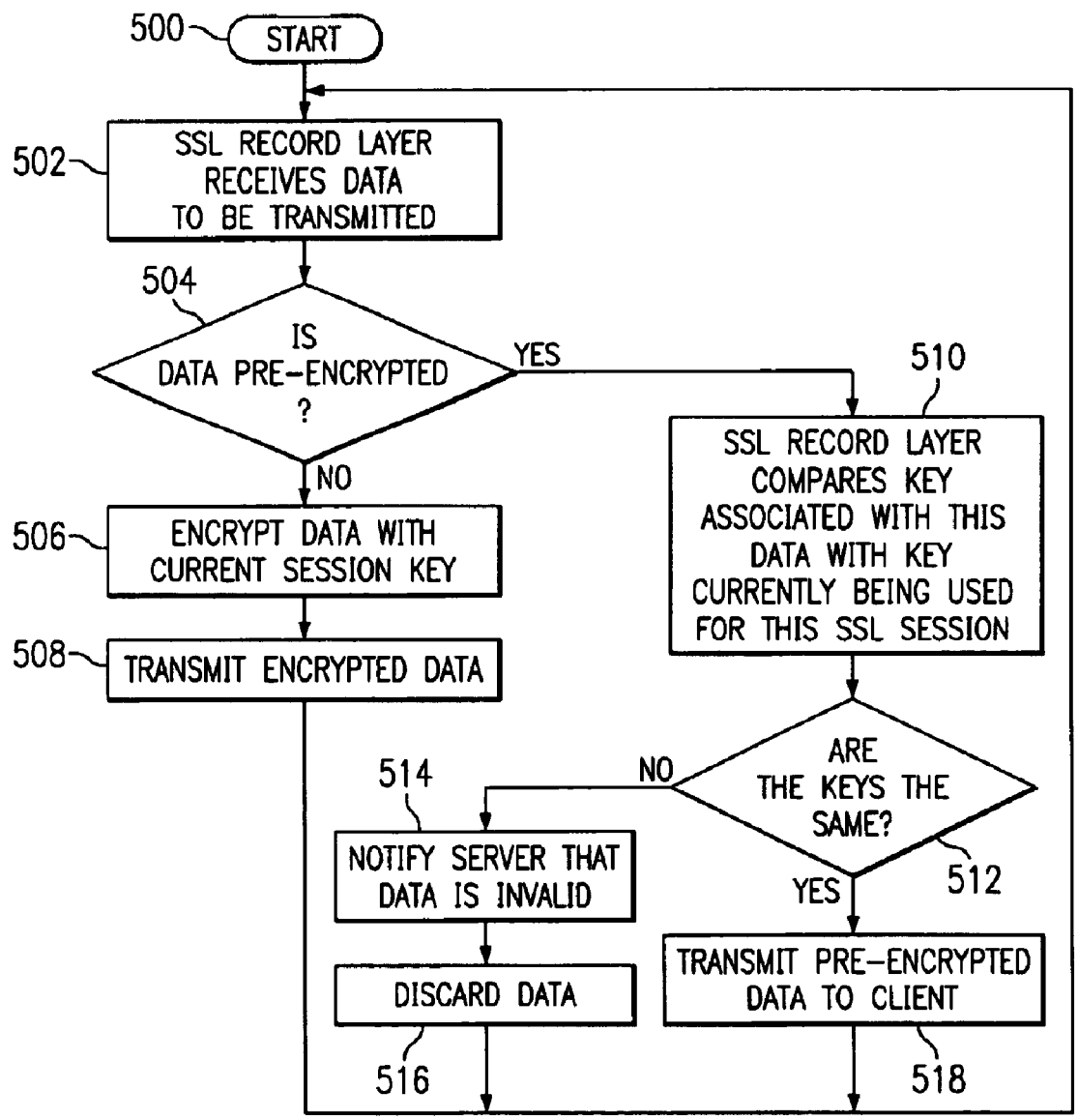
FIG. 5 illustrates a high level flow chart which depicts a secure sockets layer (SSL) record layer, that is being executed within a server computer system, transmitting pre-encrypted data in accordance with the present invention.

FIG. 5 illustrates a high level flow chart which depicts a secure sockets layer (SSL) record layer, that is being executed within a server computer system, transmitting pre-encrypted data in accordance with the present invention. The process starts as depicted by block 500 and thereafter passes to block 502 which illustrates the SSL record layer receiving data, such as an image that is to be displayed as part of a Web page, to be transmitted. Next, the SSL record layer determines whether this data has already been encrypted. If a determination is made that the data has not been pre-encrypted, i.e. the data is not encrypted, the process passes to block 506 which illustrates the SSL record layer encrypting the data using the current session encryption key. Thereafter, block 508 depicts the SSL layer transmitting the encrypted data to the client. The process then passes back to block 502.

Referring again to block 504, if the SSL record layer determines that the data has already been encrypted, the process passes to block 510 which illustrates the SSL record layer comparing the encryption key associated with this data with the encryption key currently being used for this SSL session. The process then passes to block 512 which depicts a determination of whether or not the keys are the same. The pre-encrypted image stored in this session's cache may have been encrypted using an encryption key that is different from the encryption key currently being used for this session. Each SSL session will have its own, unique encryption key. The SSL protocol permits the client and server to renegotiate the encryption key during the session such that a new, different encryption key will be used. The pre-encrypted image stored in the session's cache will have been encrypted with a particular encryption key. If the client and server have renegotiated a different encryption key, the cache data will be invalid because the encryption key used to pre-encrypt the image has changed.

If a determination is made that the keys are different, the process passes to block 514 which illustrates the SSL record layer notifying the server that the data is invalid. Next, block 516 depicts the SSL record layer discarding the data. The process then passes back to block 502. Referring again to block 512, if a determination is made that the keys are the same, the process passes to block 518 which illustrates the SSL record layer transmitting the pre-encrypted data to the client.

Figure 6:
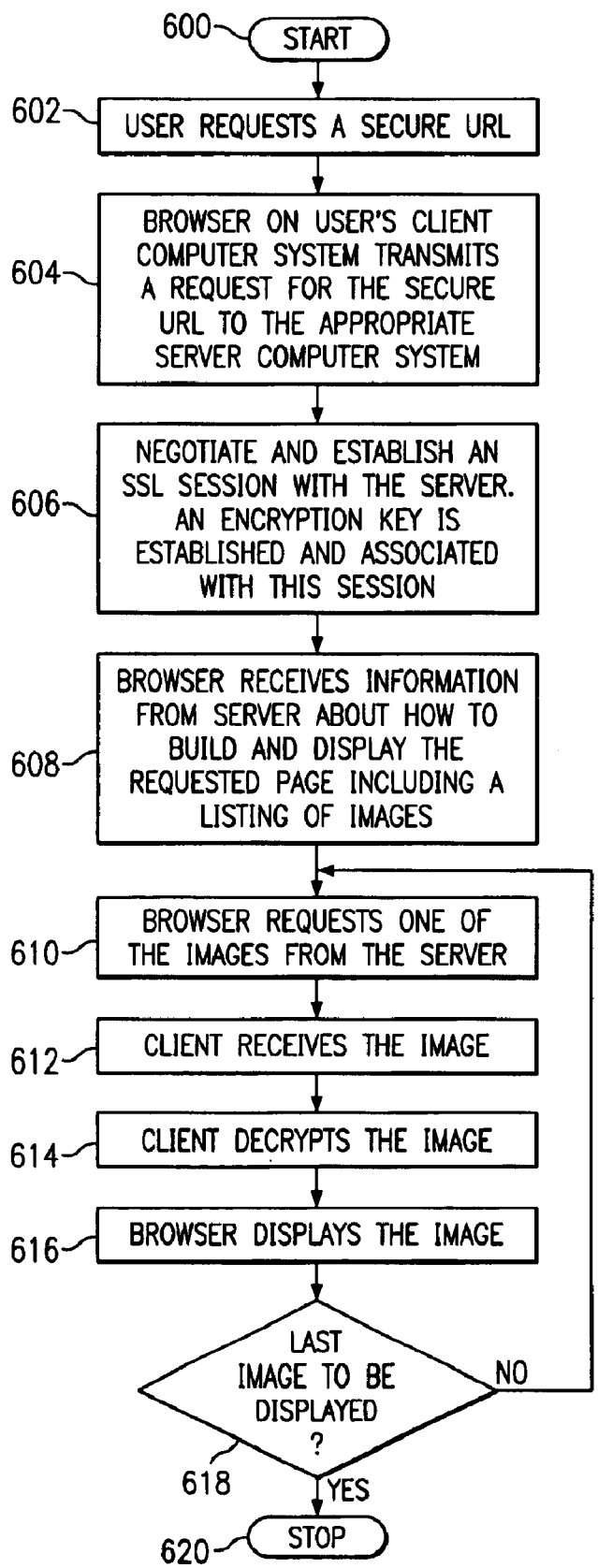
FIG. 6 illustrates a high level flow chart which depicts a process executing within a client computer system for requesting, receiving, and displaying a Web page in accordance with the present invention.

FIG. 6 illustrates a high level flow chart which depicts a process executing within a client computer system for requesting, receiving, and displaying a Web page in accordance with the present invention. The process starts as depicted by block 600 and thereafter passes to block 602 which illustrates a client computer system requesting a secure Web page identified by a particular uniform resource locator (URL). The process then passes to block 604 which depicts a browser that is executing on the client transmitting the request for the Web page by transmitting the URL to the server computer system identified by the URL. Next, block 606 illustrates the client establishing a secure sockets layer (SSL) session with the server. A particular encryption key is established and associated with this session. The process then passes to block 608 which depicts the browser receiving information from the server. This information is the content of the HTML file which describes how to build and display the requested page and includes a listing of other URL's which must be accessed in order to display the images which are part of the page.

Block 610, then, illustrates the browser requesting one of the images from the server. Next, block 612 depicts the client receiving the image. Thereafter, block 614 illustrates the client decrypting the image using the encryption key associated with this session. The process then passes to block 616 which depicts the browser displaying the decrypted image. Next, block 618 illustrates a determination of whether or not this image is the last image to be displayed for this Web page. If a determination is made that other images also need to be displayed for this Web page, the process passes back to block 610. Referring again to block 618, if a determination is made that there are no other images to be displayed, the process passes to block 620.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, said method comprising the steps of:

receiving a request from a client for a secure Web page at a server, said secure Web page including static data;

establishing a secure session between said client and said server in response to said client transmitting said request;

associating a cache with said secure session;

determining whether a pre-encrypted version of said static data has been stored in said cache in response to said receipt of said request;

in response to a determination that said pre-encrypted version of said static data has been stored in said cache, transmitting said pre-encrypted version of said static data;

receiving a request for static data included within said Web page;

checking the cache to determine whether the pre-encrypted version of said static data is already stored in said cache;

in response to a determination that said pre-encrypted version is stored in said cache, bypassing the encryption step and transmitting said pre-encrypted version of the static data; and in response to a determination that said pre-encrypted version is not stored in said cache, encrypting said static data and transmitting said encrypted static data.

2. The method according to claim 1, further comprising the step of in response to a determination that said static data has not been pre-encrypted, encrypting said static data and transmitting said encrypted static data.

3. The method according to claim 2, further comprising the step of in response to a determination that said static data has not been pre-encrypted, storing said encrypted static data.

4. The method according to claim 3, further comprising the step of storing said encrypted static data in the cache.

5. The method according to claim 1, further comprising the steps of:
receiving a request for an image included within said Web page;
checking the cache to determine whether the pre-encrypted version of said image is already stored in said cache;
in response to a determination that said pre-encrypted version of said image is stored in said cache, bypassing the encryption step and transmitting said pre-encrypted version of the image; and
in response to a determination that said pre-encrypted version of said image is not stored in said cache, encrypting said image and transmitting said encrypted image.

6. The method according to claim 1, further comprising the steps of:
receiving said request for said secure Web page, said secure Web page further including static information and dynamically-changing information data;
determining whether said static information data has been pre-encrypted;
bypassing an encryption step and transmitting said static information data in response to a determination that said static information data has been pre-encrypted;
encrypting said dynamically-changing information data; and
transmitting said encrypted, dynamically-changing information data.

7. The method according to claim 1, further comprising the step of maintaining said Web page by a secure Web site.

8. A computer program product in a data processing system, comprising:
instruction means for receiving a request from a client for a secure Web page at a server, said secure Web page including static data;.
instruction means for establishing a secure session between said client and said server in response to said client transmitting said request;
instruction means for associating a cache with said secure session;
instruction means for determining whether a pre-encrypted version of said static data has been stored in said cache in response to said receipt of said request;
instruction means for in response to a determination that said pre-encrypted version of said static data has been stored in said cache, transmitting said pre-encrypted version of said static data;
instruction means for receiving a request for static data included within said Web page;
instruction means for checking the cache to determine whether the pre-encrypted version of said static data is already stored in said cache;
instruction means for in response to a determination that said pre-encrypted version is stored in said cache, bypassing the encryption step and transmitting said pre-encrypted version of the static data; and
instruction means for in response to a determination that said pre-encrypted version is not stored in said cache, encrypting said static data and transmitting said encrypted static data.

9. The product according to claim 8, comprising instruction means for in response to a determination that said static data has not been pre-encrypted, encrypting said data and transmitting said encrypted static data.

10. The product according to claim 9, further comprising instruction means for in response to a determination that said static data has not been pre-encrypted, storing said encrypted static data.

11. The product according to claim 10, further comprising instruction means for storing said encrypted static data in the cache.

12. The product according to claim 8, further comprising:
instruction means for receiving a request for an image included within said Web page;
instruction means for checking the cache to determine whether the pre-encrypted version of said image is already stored in said cache;
instruction means for in response to a determination that said pre-encrypted version of said image is stored in said cache, bypassing the encryption step and transmitting said pre-encrypted version of the image; and
instruction means for in response to a determination that said pre-encrypted version of said image is not stored in said cache, encrypting said image and transmitting said encrypted image.

13. The product according to claim 8, further comprising:
instruction means for receiving said request for said secure Web page, said secure Web page fin-ther including static information and dynamically-changing information data;
instruction means for determining whether said static information data has been pre-encrypted;
instruction means for bypassing an encryption step and transmitting said static information data in response to a determination that said static information data has been pre-encrypted;
instruction means for encrypting said dynamically-changing information data; and
instruction means for transmitting said encrypted, dynamically-changing information data.

14. The product according to claim 8, further comprising instruction means for maintaining said Web page by a secure Web site.

15. A data processing system, comprising:
a request from a client being received by a server for a secure Web page, said secure Web page including static data;
a secure session being established between said client and said server in response to said client transmitting said request;
a cache associated with said secure session;
a CPU executing code for determining whether a pre-encrypted version of said static data has been stored in said cache in response to said receipt of said request;
in response to a determination that said pre-encrypted version of said static data has been stored in said cache, said CPU executing code for transmitting said pre-encrypted version of said static data;

said CPU receiving a request for static data included within said Web page;

said CPU checking the cache to determine whether the pre-encrypted version of said static data is already stored in said cache;

in response to a determination that said pre-encrypted version is stored in said cache, said CPU bypassing the encryption step and transmitting said pre-encrypted version of the static data; and in response to a determination that said pre-encrypted version is not stored in said cache, said CPU encrypting said static data and transmitting said encrypted static data.

16. The system according to claim 15, further comprising in response to a determination that said static data has not been pre-encrypted, said CPU executing code for encrypting said static data and transmitting said encrypted static data.

17. The system according to claim 16, further comprising in response to a determination that said static data has not been pre-encrypted, said CPU executing code for storing said encrypted static data.

18. The system according to claim 17, further comprising the cache for storing said encrypted static data.

19. The system according to claim 15, further comprising:

said Web page including a request for an image included within said Web page;

said CPU executing code for checking the cache to determine whether the pre-encrypted version of said image is already stored in said cache;

in response to a determination that said pre-encrypted version of said image is stored in said cache, said CPU executing code for bypassing the encryption step and transmitting said pre-encrypted version of the image; and in response to a determination that said pre-encrypted version of said image is not stored in said cache, said CPU executing code for encrypting said image and transmitting said encrypted image.

20. The system according to claim 15, further comprising:

said secure Web page further including static information and dynamically-changing information data;

said CPU executing code for determining whether said static information data has been pre-encrypted;

said CPU executing code for bypassing an encryption step and transmitting said static information data in response to a determination that said static information data has been pre-encrypted;

said CPU executing code for encrypting said dynamically-changing information data; and said CPU executing code for transmitting said encrypted, dynamically-changing information data.

21. The system according to claim 15, further comprising said Web page being maintained by a secure Web site.

* * * * *